United States Patent
Wang et al.

(10) Patent No.: US 10,855,618 B2
(45) Date of Patent: Dec. 1, 2020

(54) BANDWIDTH ADJUSTMENT METHOD AND RELATED DEVICE

(71) Applicant: HUAWEI TECHNOLOGIES CO., LTD., Shenzhen (CN)

(72) Inventors: Hao Wang, Nanjing (CN); Hongguang Guan, Shenzhen (CN); Lei Han, Nanjing (CN); Hanyu Wei, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 15/884,314

(22) Filed: Jan. 30, 2018

(65) Prior Publication Data

US 2018/0159796 A1    Jun. 7, 2018

Related U.S. Application Data

(63) Continuation of application No. PCT/CN2016/087307, filed on Jun. 27, 2016.

(30) Foreign Application Priority Data

Jul. 30, 2015    (CN) .......................... 2015 1 0458820

(51) Int. Cl.
*H04L 12/911*      (2013.01)
*H04L 12/927*      (2013.01)
(Continued)

(52) U.S. Cl.
CPC ............ *H04L 47/822* (2013.01); *H04L 47/80* (2013.01); *H04N 21/238* (2013.01); *H04N 21/64738* (2013.01)

(58) Field of Classification Search
None
See application file for complete search history.

(56) References Cited

U.S. PATENT DOCUMENTS

2001/0007099 A1*   7/2001   Rau ........................ G06Q 30/02
                                                                       705/26.8
2007/0073878 A1*   3/2007   Issa ..................... H04L 67/2823
                                                                       709/225

(Continued)

FOREIGN PATENT DOCUMENTS

CN            101035264 A      9/2007
CN            101072180 A     11/2007
(Continued)

*Primary Examiner* — Philip J Chea
*Assistant Examiner* — Hassan A Khan
(74) *Attorney, Agent, or Firm* — Kilpatrick Townsend & Stockton LLP

(57) ABSTRACT

The present invention discloses a bandwidth adjustment method and a related device, so as to flexibly adjust a bandwidth. A controller obtains behavior characteristic statistics sent by an end cloud node device, and obtains bandwidth resources remaining on a system. The behavior characteristic statistics are a statistical result indicating behavior characteristics of occupying network bandwidth resources by a user when accessing the end cloud node device. The controller determines a bandwidth adjustment amount of the end cloud node device according to the behavior characteristic statistics and bandwidth remaining on the system. The controller sends a bandwidth adjustment instruction to a first network device. The bandwidth adjustment instruction is used to instruct the first network device to adjust, according to the bandwidth adjustment amount, a bandwidth allocated to the end cloud node device by a network device on a transmission link.

23 Claims, 6 Drawing Sheets

(51) Int. Cl.
*H04N 21/238* (2011.01)
*H04N 21/647* (2011.01)

(56) References Cited

U.S. PATENT DOCUMENTS

| | | | |
|---|---|---|---|
| 2011/0191420 A1* | 8/2011 | Painter | H04N 21/44209 |
| | | | 709/204 |
| 2014/0047077 A1* | 2/2014 | Desai | H04L 67/32 |
| | | | 709/219 |
| 2015/0124617 A1* | 5/2015 | Luna | H04W 52/0258 |
| | | | 370/235 |
| 2017/0324619 A1 | 11/2017 | Zhu et al. | |

FOREIGN PATENT DOCUMENTS

| | | | |
|---|---|---|---|
| CN | 101155093 | A | 4/2008 |
| CN | 101188562 | A | 5/2008 |
| CN | 101674614 | A | 3/2010 |
| CN | 101827017 | A | 9/2010 |
| CN | 103188165 | A | 7/2013 |
| CN | 104486254 | A | 4/2015 |
| CN | 104580018 | A | 4/2015 |
| CN | 104618157 | A | 5/2015 |
| EP | 2157736 | A1 | 2/2010 |
| WO | 2008080350 | A1 | 7/2008 |

\* cited by examiner

US 10,855,618 B2

BANDWIDTH ADJUSTMENT METHOD AND RELATED DEVICE

CROSS-REFERENCE TO RELATED APPLICATIONS

This application is a continuation of International Application No. PCT/CN2016/087307, filed on Jun. 27, 2016, which claims priority to Chinese Patent Application No. 201510458820.X, filed on Jul. 30, 2015. The disclosures of the aforementioned applications are hereby incorporated by reference in their entireties.

TECHNICAL FIELD

The present invention relates to the field of communications technologies, and in particular, to a bandwidth adjustment method and a related device.

BACKGROUND

Currently, traffic in a network is mainly video traffic.

As videos have developed from standard definition to high definition and then to ultra high definition (UHD), technologies emerge such as a multi-dimensional holographic technology capable of extending user experience from a two-dimensional plane to a three-dimensional space, remote interactive virtual reality gaming, and driverless driving. Such technological advancements require a network to provide a higher bandwidth and a lower end-to-end delay. For example, to obtain good user experience, a 4K video requires a bandwidth of 60 Mbps (Mbps) to 112 Mbps, which is 17 to 32 times that required by an existing 1080P high definition video. It is predicted that in 2018, 67% of video data streams in the whole world will be transmitted over content delivery networks (CDN). Assuming that an over the top (OTT) service model remains unchanged, a network bandwidth required for transmitting a 4K video needs to be increased by 5 to 11 times, and a required CDN transmission capability needs to be increased by 11 to 22 times. However, income and network investment of both a content provider (CP) and an Internet service provider (ISP) are much lower than this level. Therefore, how to meet a network transmission requirement while keeping network transmission affordable is a problem of interest to both the CP and the ISP.

Currently, a special wireless router becomes commercially available. In addition to having a wireless routing function, the wireless router further allows video content on a particular website to be locally cached and allows the video content to be provided to another user. As shown in FIG. 1, a working procedure of the special wireless router is as follows:

Step 1: A server of a particular website pushes a popular video to a special wireless router of a user A in advance. A transmission path of a video content packet is: the server->routers at different levels->a broadband remote access server (BRAS)->a digital subscriber line access multiplexer (DSLAM)/an optical line terminal (OLT)->various x digital subscriber line (xDSL) modems/optical network terminals (ONT)->the special wireless router of the user A. A transmission direction of the packet is referred to as a downstream direction. In this step, packet transmission performance is mainly related to a downlink bandwidth capability.

Step 2: A user B requests on demand the popular video, and sends an on-demand request to the server of the particular website.

Step 3: The server of the particular website determines that the special wireless router of the user A stores content of the popular video, and notifies the user B. For example, the server of the particular website sends an HTTP redirection message to the user B. The HTTP message carries an IP address of the special wireless router of the user A and other information.

Step 4: The user B obtains the video content from the special wireless router of the user A. In this case, a transmission path of a video content packet is: the special wireless router of the user A->an xDSL Modem/ONT corresponding to the user A->a DSLAM/OLT corresponding to the user A->a BRAS->a DSLAM/OLT corresponding to the user B->an xDSL Modem/ONT corresponding to the user B->the user B. A transmission direction from the special wireless router of the user A to the BRAS is referred to as an upstream direction. A direction of a path from the BRAS to the user B is referred to as a downstream direction.

It can be learned that in FIG. 1, an uplink bandwidth of the user A is used in the upstream direction, and a downlink bandwidth of the user B is used in the downstream direction. Herein, for example, the user A and the user B are connected to different OLTs connected to a same BRAS. If the user A and the user B are connected to a same OLT, traffic between the user A and the user B may be forwarded by an upstream BRAS connected to the OLT or may be directly forwarded by the OLT, depending on different network deployments. If the user A and the user B are connected to different BRASs, a transmission link further includes links connecting routers at different levels between the BRASs.

For a broadband access service provided by an ISP to a user, an access bandwidth in an upstream direction and an access bandwidth in a downstream direction are usually asymmetric. In a conventional ADSL access mode, a typical downlink access bandwidth is 4 Mbps, and an uplink access bandwidth is usually only 512 Kbps. In an optical access mode, a typical downlink access bandwidth is 10 Mbps to 100 Mbps, and an uplink access bandwidth is 1 Mbps to 4 Mbps. It is assumed that the uplink bandwidth of the user A is 4 Mbps, and the downlink bandwidth of the user B is 100 Mbps. When the special wireless router of the user A provides video content to the user B, a maximum transmission rate is restricted by the uplink bandwidth of the user A, and can reach a maximum of only 4 Mbps.

It can be learned that how to avoid a restriction on a distributed CDN service by an uplink access bandwidth is a problem needing to be resolved.

SUMMARY

Embodiments of the present invention provide a bandwidth adjustment method and a related device, so as to flexibly adjust a bandwidth.

Specific technical solutions provided in the embodiments of the present invention are as follows.

According to a first aspect, a bandwidth adjustment method is provided, including:

obtaining, by a controller, behavior characteristic statistics sent by an end cloud node device, and obtaining bandwidth remaining on a system, where the behavior characteristic statistics are a statistical result indicating behavior characteristics of occupying network bandwidth by a user when accessing the end cloud node device;

determining, by the controller, a bandwidth adjustment amount of the end cloud node device according to the behavior characteristic statistics and bandwidth remaining on the system; and sending, by the controller, a bandwidth adjustment instruction to a first network device, where the bandwidth adjustment instruction is used to instruct the first network device to adjust, according to the bandwidth adjustment amount, a bandwidth allocated to the end cloud node device by a network device on a transmission link.

With reference to the first aspect, in a first possible implementation, the determining, by the controller, a bandwidth adjustment amount of the end cloud node device according to the behavior characteristic statistics and bandwidth remaining on the system includes:

determining, by the controller, a capability score according to the behavior characteristic statistics and a scoring parameter, where the capability score is used to reflect a service providing capability of the end cloud node device; and determining, by the controller, the bandwidth adjustment amount of the end cloud node device according to the capability score and bandwidth remaining on the system.

With reference to the first possible implementation of the first aspect, in a second possible implementation, the scoring parameter includes any one or a combination of a transmission link characteristic of the end cloud node device, a processing capability of the end cloud node device, a comment of an end cloud service user on a service provided by the end cloud node device, or historical capability score data of the end cloud node device.

With reference to the first aspect or the first or the second possible implementation, in a third possible implementation, the first network device is a network device located on a transmission link connecting the end cloud node device and a gateway, or the first network device is a network device that has established a connection to at least one network device located on a transmission link connecting the end cloud node device and a gateway.

According to a second aspect, a bandwidth adjustment method is provided, including:

receiving, by a first network device, a bandwidth adjustment instruction sent by a controller, where the bandwidth adjustment instruction carries a bandwidth adjustment amount of an end cloud node device; and adjusting, by the first network device according to the bandwidth adjustment amount, a bandwidth allocated to the end cloud node device by a network device located on a transmission link connecting the end cloud node device and a gateway.

With reference to the second aspect, in a first possible implementation, the first network device is a network device on the transmission link, or the first network device is a network device that has established a connection to at least one network device on the transmission link.

According to a third aspect, a bandwidth adjustment method is provided, including:

collecting, by an end cloud node device, statistics about behavior characteristics of occupying network bandwidth by a user when accessing the end cloud node device, to obtain behavior characteristic statistics; and reporting, by the end cloud node device, the behavior characteristic statistics to a controller, so that the controller determines a bandwidth adjustment amount of the end cloud node device according to the behavior characteristic statistics and bandwidth remaining on a system.

With reference to the third aspect, in a first possible implementation, the method further includes:

determining, by the end cloud node device, whether a to-be-transmitted service flow is a service flow for providing a service; and if determining that the to-be-transmitted service flow is a service flow for providing the service, transmitting the service flow by using a first bandwidth, where the first bandwidth is a bandwidth after adjustment is performed according to an instruction of a first network device; or if determining that the to-be-transmitted service flow is not a service flow for providing the service, transmitting the service flow by using a second bandwidth, where the second bandwidth is a bandwidth before adjustment is performed according to an instruction of the first network device.

According to a fourth aspect, a controller is provided, including:

an obtaining module, configured to: obtain behavior characteristic statistics sent by an end cloud node device, and obtain bandwidth remaining on a system, where the behavior characteristic statistics are a statistical result indicating behavior characteristics of occupying network bandwidth by a user when accessing the end cloud node device;

a processing module, configured to determine a bandwidth adjustment amount of the end cloud node device according to the behavior characteristic statistics and bandwidth remaining on the system; and a sending module, configured to send a bandwidth adjustment instruction to a first network device, where the bandwidth adjustment instruction is used to instruct the first network device to adjust, according to the bandwidth adjustment amount, a bandwidth allocated to the end cloud node device by a network device on a transmission link.

With reference to the fourth aspect, in a first possible implementation, the processing module is specifically configured to:

determine a capability score according to the behavior characteristic statistics and a scoring parameter, where the capability score is used to reflect a service providing capability of the end cloud node device; and determine the bandwidth adjustment amount of the end cloud node device according to the capability score and bandwidth remaining on the system.

With reference to the first possible implementation of the fourth aspect, in a second possible implementation, the scoring parameter includes any one or a combination of a transmission link characteristic of the end cloud node device, a processing capability of the end cloud node device, a comment of an end cloud service user on a service provided by the end cloud node device, or historical capability score data of the end cloud node device.

With reference to the fourth aspect or the first or the second possible implementation, in a third possible implementation, the first network device is a network device located on a transmission link connecting the end cloud node device and a gateway, or the first network device is a network device that has established a connection to at least one network device located on a transmission link connecting the end cloud node device and a gateway.

According to a fifth aspect, a network device is provided, including:

a receiving module, configured to receive a bandwidth adjustment instruction sent by a controller, where the bandwidth adjustment instruction carries a bandwidth adjustment amount of an end cloud node device; and a processing module, configured to adjust, according to the bandwidth adjustment amount, a bandwidth allocated to the end cloud node device by a network device located on a transmission link connecting the end cloud node device and a gateway.

With reference to the fifth aspect, in a first possible implementation, the network device is a network device on the transmission link, or the network device is a network device that has established a connection to at least one network device on the transmission link.

According to a sixth aspect, an end cloud node device is provided, including:

a statistics collection module, configured to collect statistics about behavior characteristics of occupying network bandwidth by a user when accessing the end cloud node device, to obtain behavior characteristic statistics; and a reporting module, configured to report the behavior characteristic statistics to a controller, so that the controller determines a bandwidth adjustment amount of the end cloud node device according to the behavior characteristic statistics and bandwidth remaining on a system.

With reference to the sixth aspect, in a first possible implementation, the end cloud node device further includes a determining module, configured to: determine whether a to-be-transmitted service flow is a service flow for providing a service; and if determining that the to-be-transmitted service flow is a service flow for providing the service, transmit the service flow by using a first bandwidth, where the first bandwidth is a bandwidth after adjustment is performed according to an instruction of a first network device; or if determining that the to-be-transmitted service flow is not a service flow for providing the service, transmit the service flow by using a second bandwidth, where the second bandwidth is a bandwidth before adjustment is performed according to an instruction of the first network device.

Based on the foregoing technical solutions, in the embodiments of the present invention, the controller determines the bandwidth adjustment amount of the end cloud node device according to the behavior characteristic statistics of the end cloud node device and bandwidth remaining on the system, and sends the bandwidth adjustment instruction to the first network device, to instruct the first network device to adjust, according to the determined bandwidth adjustment amount, the bandwidth allocated to the end cloud node device by the network device on the transmission link. Therefore, a bandwidth allocated to a single end cloud node device can be dynamically adjusted, thereby improving utilization of system bandwidth resources.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without undue experiment shall fall within the protection scope of the present invention.

Figure 1:
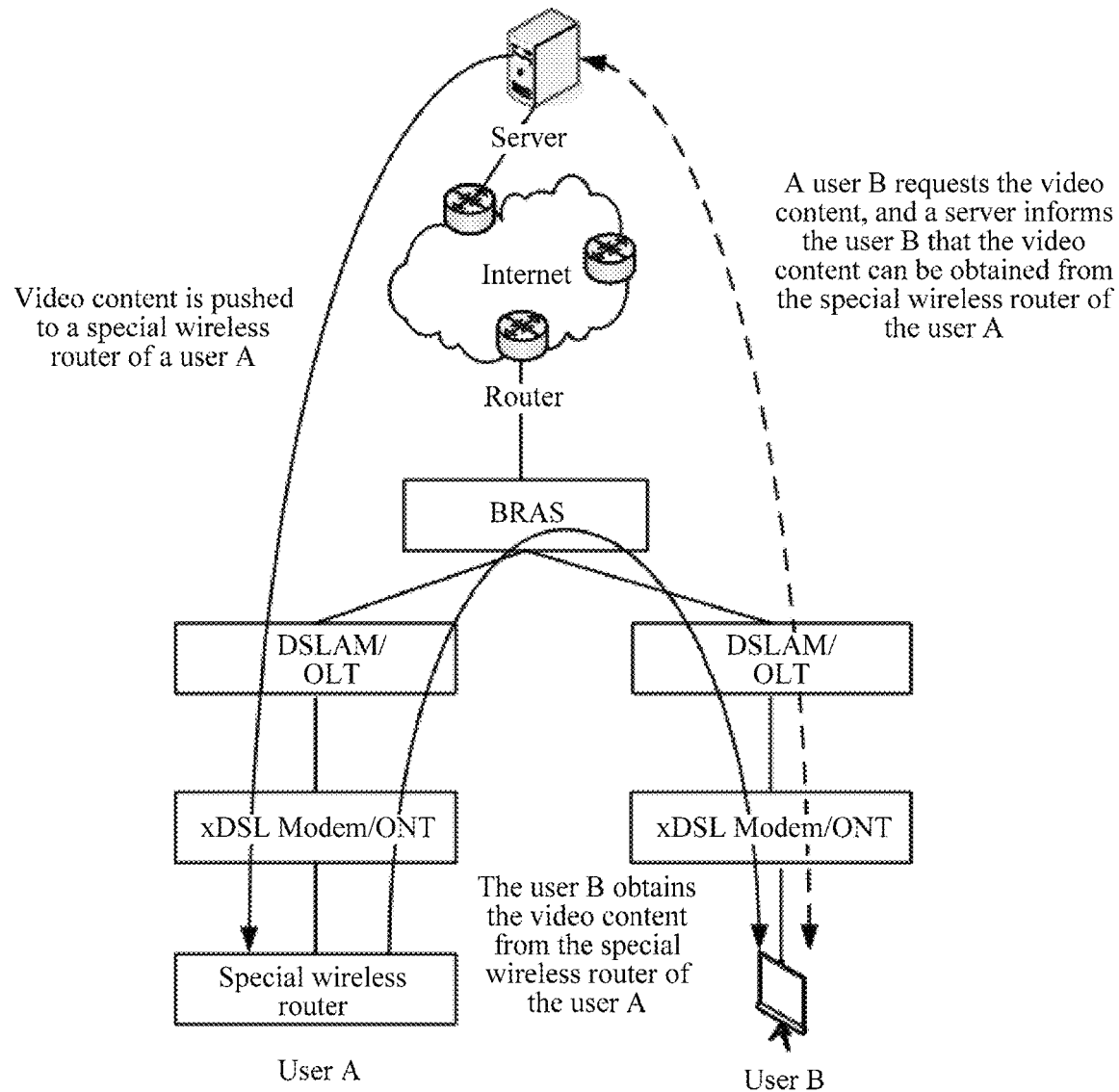
FIG. 1 is a schematic flowchart of providing a content service by a wireless router.
Figure 2:
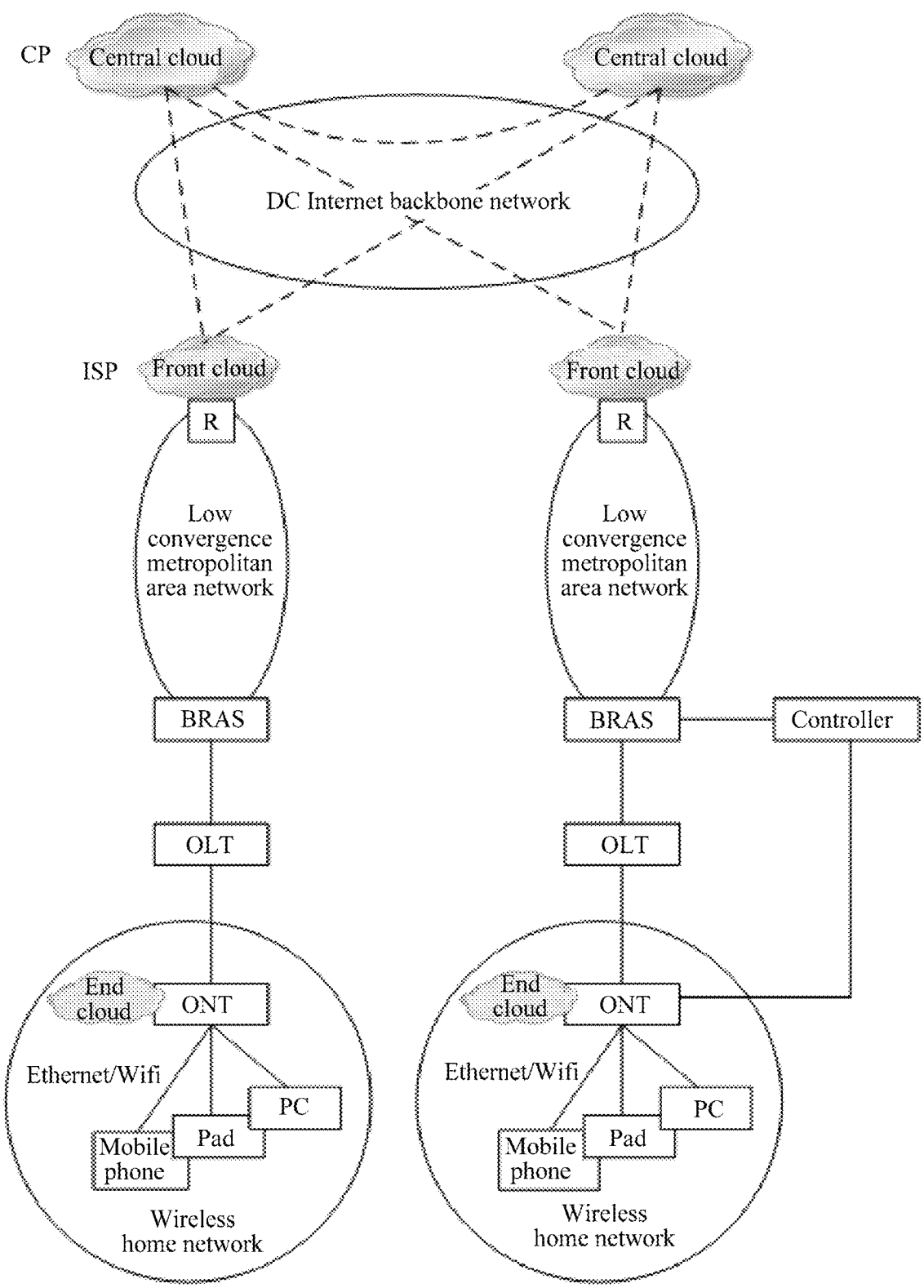
FIG. 2 is a schematic diagram of a network architecture of an end cloud deployment.

As shown in FIG. 2, with emergence of cloud computing technologies, an increasing quantity of CPs have migrated services to clouds. In this specification, a cloud data center of a CP is referred to as a central cloud. In consideration of costs, power supply, and the like, central clouds are usually established in remote regions, and are relatively far away from end users, leading to relatively poor experience for some services. A computing resource provided by an ISP in a metropolitan area network is referred to as a front cloud. Some service data and processing are migrated from a central cloud to a front cloud to optimize network traffic.

As ultra-high definition videos and wireless home networks emerge and Internet of Things (IoT) applications in smart households become popular, computing resources and/or storage resources in a home network may be integrated to provide a service, so as to further optimize network traffic. In this specification, a cloud service deployed within a home is defined as an end cloud service. In addition, the end cloud service may also be applied to a scenario covering a larger area than a home, for example, an office, a floor, etc.

In the embodiments of the present invention, a service provided by integrating resources of one or more terminal devices is referred to as an end cloud service, and a device that provides an end cloud service is defined as an end cloud node device.

In an optical access technology, an end cloud node device is an ONT. A computing resource and/or a storage resource of the end cloud node device includes a computing resource and/or a storage resource inside the ONT, and further includes a computing resource and/or a storage resource of each terminal device in a home network connected to the ONT, for example, a computing resource and/or a storage resource of a terminal device such as a mobile phone, a tablet computer, a personal computer, or a smart appliance that is connected to the ONT by using a port such as a USB port. The ONT has a local resource management function, and manages an internal resource pool and an external resource pool of the ONT. Specifically, the external resource pool managed by the ONT may register, by means of pre-configuration or an automatic discovery mechanism between devices, a computing resource and/or a storage resource of each terminal device connected to the end cloud node device to the ONT. The ONT provides externally a unified resource access interface of the internal resource pool and the external resource pool. When an external resource allocation system uses a resource of an end cloud node device, an ONT of the end cloud node device maps a resource request to a resource that has been registered.

Similarly, in an xDSL access technology, an end cloud node device is an xDSL modem. A computing resource and/or a storage resource of the end cloud node device includes a computing resource and/or a storage resource inside the xDSL modem, and further includes a computing resource and/or a storage resource of each terminal device in a home network connected to the xDSL modem. As the center of the end cloud node device, the xDSL modem has a local resource management function. A computing resource and/or a storage resource of each terminal device connected to the end cloud node device may be registered to the xDSL modem by means of pre-configuration or an automatic discovery mechanism between devices. The xDSL modem provides externally a resource access interface.

An optical access network is used as an example for description in the following embodiments. It should be noted that the present invention is not limited to the optical access network, and the present invention may be applied to another access network according to the following embodiments, as long as network devices in the following embodiments are replaced with network devices having same functions in the another access network. For example, an ONT in the following embodiments is replaced with an xDSL modem and an OLT in the following embodiments is replaced with a DSLAM.

It should be noted that in addition to providing a content service, an end cloud node device in the embodiments of the present invention may further provide another service. In the following embodiments, an example in which the end cloud node device provides the content service is used only for description, and the protection scope of the present invention is not limited thereto.

When an end cloud node device is used to provide a service, a bandwidth of an uplink from the end cloud node device to a gateway is critical for uplink transmission performance. During specific implementation, according to different network devices that implement an end cloud node function, the end cloud node device may be a network device such as an ONT or an OLT.

In the embodiments of the present invention, a bandwidth resource pool includes a bandwidth resource that has not been allocated by an ISP and a bandwidth resource that has been allocated by the ISP to a user and that has not been used by the user. Because a bandwidth resource in the bandwidth resource pool is limited, how to allocate a resource in the bandwidth resource pool to an end cloud node device that provides a service is critical for improving quality of the service provided by the end cloud node device.

At an initial stage of end cloud service deployment, when a quantity of end cloud node devices is less than a specified threshold or when a quantity of idle bandwidth resources of an ISP is greater than a preset threshold, no complex bandwidth adjustment policy is required, and the following two bandwidth adjustment manners may be used:

Manner 1: If a network device determines, according to subscription information of a user, that the user has subscribed to an end cloud service, the network device increases a bandwidth allocated to the user, that is, increases bandwidths of all end cloud node devices. The subscription information of the user is a trigger condition for bandwidth adjustment.

Manner 2: A network device identifies an end cloud node device that provides a service to a particular CP, and increases only a bandwidth of the identified end cloud node device. Specifically, a data stream that provides the service to the particular CP may be identified according to a 5-tuple in a data packet or a particular field in an HTTP message, so as to further identify the end cloud node device that provides the service to the particular CP.

At intermediate and later stages of end cloud service deployment, when a quantity of end cloud node devices is greater than a specified threshold or when a quantity of idle bandwidth resources of an ISP is less than a preset threshold, a refined bandwidth adjustment policy is required, so as to improve overall utilization of the idle bandwidth resources and ensure quantity of a service provided by an end cloud node device.

It should be noted that a controller in the following embodiments is a logical entity. During actual implementation, a controller may be deployed in a network system as a new network device, or a controller may be integrated into a network device that has been deployed in a network system.

It should be noted that in the following embodiments, bandwidth adjustment is mainly applied to an uplink bandwidth adjustment scenario, but does not exclude its application to a downlink bandwidth adjustment scenario.

Figure 3:
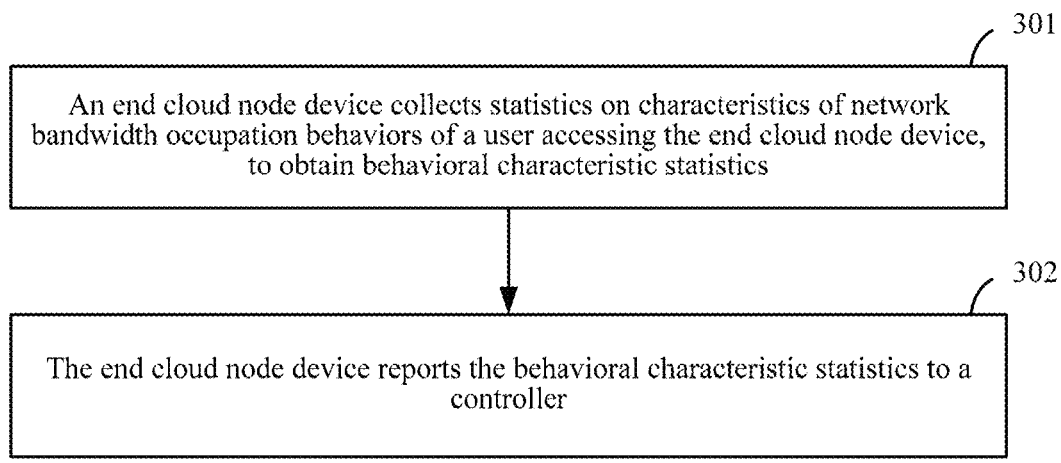
FIG. 3 is a schematic flowchart of a bandwidth adjustment method performed by an end cloud node device according to an embodiment of the present invention.

Based on the foregoing analysis, in an embodiment of the present invention, as shown in FIG. 3, a procedure of a bandwidth adjustment method performed by an end cloud node device is as follows.

Step 301: The end cloud node device collects statistics about behavior characteristics of occupying network bandwidth resources by a user when accessing the end cloud node device, to obtain behavior characteristic statistics.

During specific implementation, the behavior characteristic statistics include, but are not limited to, indicators such as a network access time period, a type of a transmitted service, uplink and downlink transmission bitrates, a transmission delay, and a packet loss rate during transmission.

Step 302: The end cloud node device reports the behavior characteristic statistics to a controller, so that the controller determines a bandwidth adjustment amount of the end cloud node device according to the behavior characteristic statistics and bandwidth remaining on a system.

In a specific implementation, the end cloud node device reports the behavior characteristic statistics of the end cloud node device during a preset duration period.

The bandwidth adjustment amount is an uplink bandwidth adjustment amount.

Figure 4:
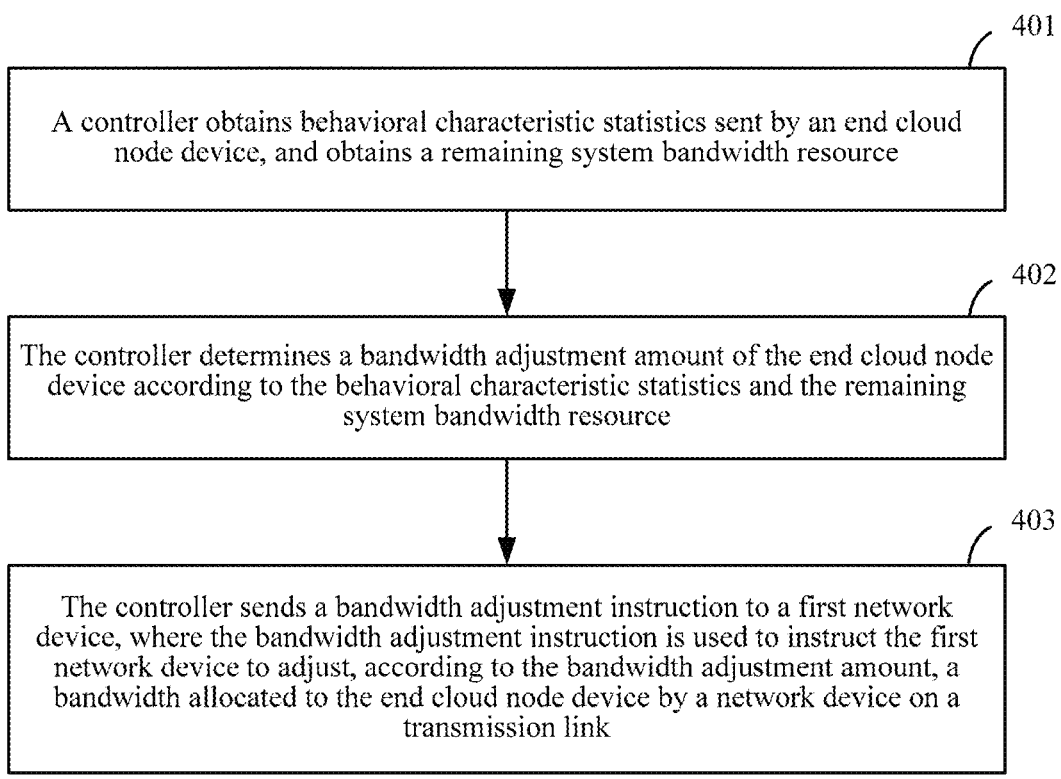
FIG. 4 is a schematic flowchart of a bandwidth adjustment method performed by a controller according to an embodiment of the present invention.

As shown in FIG. 4, a detailed procedure of a bandwidth adjustment method performed by a controller is as follows.

Step 401: The controller obtains behavior characteristic statistics sent by an end cloud node device, and obtains bandwidth remaining on a system.

The behavior characteristic statistics are a statistical result indicating behavior characteristics of occupying network bandwidth resources by a user when accessing the end cloud node device.

During specific implementation, the behavior characteristic statistics include, but are not limited to, indicators such as a network access time period, a type of a transmitted service, uplink and downlink transmission bitrates, a transmission delay, and a packet loss rate during transmission.

The type of the transmitted service and the uplink and downlink transmission bitrates reflect an occupation status of a physical bandwidth. The transmission delay, the packet loss rate, and the like that exist during transmission reflect quality of a transmission link. For example, the type of the transmitted service may be a video, e-commerce, web browsing, a social application, a cloud storage file, file downloading, online gaming, or the like.

Step 402: The controller determines a bandwidth adjustment amount of the end cloud node device according to the behavior characteristic statistics and bandwidth remaining on the system.

During implementation, the controller determines a capability score according to the behavior characteristic statistics and a scoring parameter, where the capability score is used to reflect a service providing capability of the end cloud node device. The controller determines the bandwidth adjustment amount of the end cloud node device according to the capability score and bandwidth remaining on the system.

The scoring parameter includes any one or a combination of a transmission link characteristic of the end cloud node device, a processing capability of the end cloud node device, a comment of an end cloud service user on a service provided by the end cloud node device, or historical capability score data of the end cloud node device.

During specific implementation, the transmission link characteristic of the end cloud node device may be obtained from a system such as an operation support system (OSS)/an authentication, authorization, and accounting (AAA) system. The transmission link characteristic includes a link type, a bandwidth, and the like.

In a specific implementation, the controller obtains the behavior characteristic statistics of the end cloud node device during a preset period, and determines the bandwidth adjustment amount of the end cloud node device based on behavior characteristic statistics collected within one or more periods.

In a specific implementation, the capability score is directly proportional to the service providing capability of the end cloud node device, the capability score is directly proportional to the bandwidth adjustment amount, and bandwidth remaining on the system is directly proportional to the bandwidth adjustment amount.

For example, the capability score is calculated by using a formula (1):

$$\text{Score} = \beta * \sum_{i=1}^{n} \alpha_i * C_i + (1-\beta) * \text{Score}_h \quad (1)$$

where Score represents the capability score, $C_i$ is an $i^{th}$ piece of behavior characteristic statistics in $1^{st}$ to $n^{th}$ pieces of behavior characteristic statistics, $\alpha_i$ is a weighting factor of the behavior characteristic statistics $C_i$ and is used to control a degree of influence of a single piece of behavior characteristic statistics on the capability score, $\text{Score}_h$ is a historical score of the end cloud node device (which may be a latest score or may be an average of several latest scores), and $\beta$ is a smoothing coefficient and is used to control a degree of influence of the historical score on the capability score.

For example, the bandwidth adjustment amount of the end cloud node device is determined by using a formula (2):

$$\Delta_{Adjust} = \begin{cases} 2*\Delta_{basic} * \sqrt[3]{\text{Perc}_{free\_bw}} & 80 < \text{Score} \le 100 \\ 1.5*\Delta_{basic} * \sqrt[3]{\text{Perc}_{free\_bw}} & 60 < \text{Score} \le 80 \\ 1.0*\Delta_{basic} * \sqrt[3]{\text{Perc}_{free\_bw}} & 40 < \text{Score} \le 60 \\ 0.5*\Delta_{basic} * \sqrt[3]{\text{Perc}_{free\_bw}} & 20 < \text{Score} \le 40 \\ 0.1*\Delta_{basic} * \sqrt[3]{\text{Perc}_{free\_bw}} & 0 < \text{Score} \le 20 \end{cases} \quad (2)$$

where Score represents the capability score, $\Delta_{basic}$ is a preset bandwidth adjustment unit, $\text{Perc}_{free\_bw}$ is an idle resource percentage, that is, a ratio of bandwidth remaining on a system to a total system resource, and $\Delta_{Adjust}$ is the bandwidth adjustment amount. According to the formula (2), a higher capability score indicates a larger bandwidth adjustment amount, and a larger idle resource percentage indicates a larger bandwidth adjustment amount, thereby ensuring that a resource in a bandwidth resource pool can be effectively allocated to an end cloud node device that has a relatively high service providing capability, and improving overall quality of service of an end cloud system.

For example, a video service mainly occupies a downlink bandwidth of an end cloud node device, a cloud storage service mainly occupies an uplink bandwidth of the end cloud node device, and traffic duration of the two services is relatively long. Web browsing occupies a relatively small bandwidth, and has intermittent and bursting traffic. End cloud node devices are scored according to service types of the video service, the cloud storage service, and the web browsing service, and an end cloud node device that uses the web browsing service has a highest capability score. Therefore, more bandwidth resources may be allocated to the end cloud node device that uses the web browsing service, so as to improve quality of the services provided by the end cloud node devices.

Step 403: The controller sends a bandwidth adjustment instruction to a first network device, where the bandwidth adjustment instruction is used to instruct the first network device to adjust, according to the bandwidth adjustment amount, a bandwidth allocated to the end cloud node device by a network device on a transmission link.

The first network device is a network device located on a transmission link connecting the end cloud node device and a gateway, or the first network device is a network device that has established a connection to at least one network device located on a transmission link connecting the end cloud node device and a gateway. The gateway may be a BRAS or a broadband network gateway (BNG).

For example, the first network device may be an SDN controller, a network management system server, a BRAS, an OLT, or an ONT.

The bandwidth adjustment amount is an uplink bandwidth adjustment amount.

Figure 5:
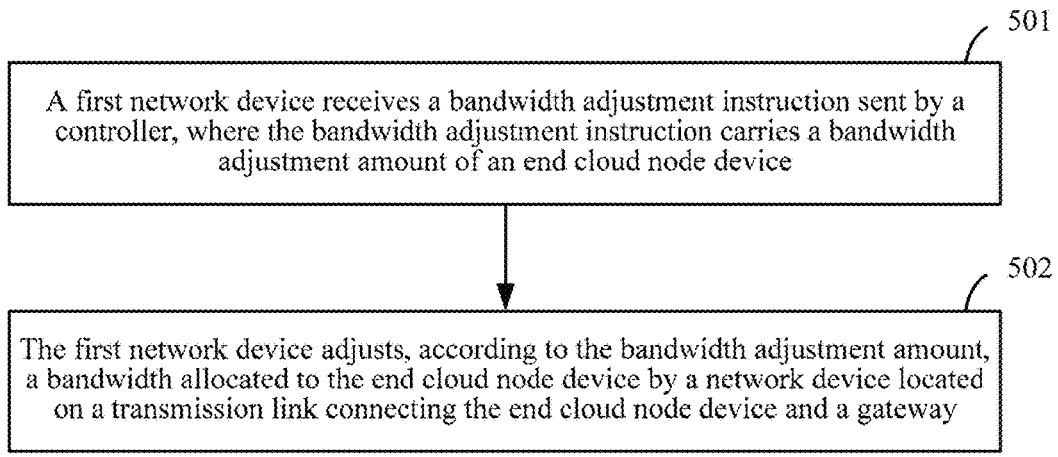
FIG. 5 is a schematic flowchart of a bandwidth adjustment method performed by a first network device according to an embodiment of the present invention.

As shown in FIG. 5, a process in which a first network device controls a network device on a transmission link of an end cloud node device to adjust a bandwidth allocated to the end cloud node device is as follows.

Step 501: The first network device receives a bandwidth adjustment instruction sent by a controller, where the bandwidth adjustment instruction carries a bandwidth adjustment amount of the end cloud node device.

The first network device is a network device on a transmission link between the end cloud node device and a gateway, or the first network device is a network device that has established a connection to at least one network device on a transmission link between the end cloud node device and a gateway.

Step 502: The first network device adjusts, according to the bandwidth adjustment amount, a bandwidth allocated to the end cloud node device by a network device located on a transmission link connecting the end cloud node device and a gateway.

The gateway may be a BRAS or a BNG

During implementation, after the first network device adjusts the bandwidth allocated to the end cloud node device by the network device on the transmission link of the end cloud node device, the end cloud node device determines whether a to-be-transmitted service flow is a service flow for providing a service; and if determining that the to-be-transmitted service flow is a service flow for providing the service, transmits the service flow by using a first bandwidth, where the first bandwidth is a bandwidth after adjustment is performed according to an instruction of the first network device; or if determining that the to-be-transmitted service flow is not a service flow for providing the service, transmits the service flow by using a second bandwidth, where the second bandwidth is a bandwidth before adjustment is performed according to an instruction of the first network device. This ensures that the adjusted bandwidth is used by the end cloud node device to provide the service, avoids interference between a network service flow used by the end cloud node device and a service flow for providing the service, and ensures quality of service (QoS) of the service flows.

During specific implementation, bandwidth resources respectively occupied by the network service flow used by the end cloud node device and the service flow for providing the service may be specified by using a technology such as a committed access rate (CAR) technology or an access control list (ACL) technology.

The bandwidth allocated to the end cloud node device that is adjusted is an uplink bandwidth allocated to the end cloud node device.

Figure 6:
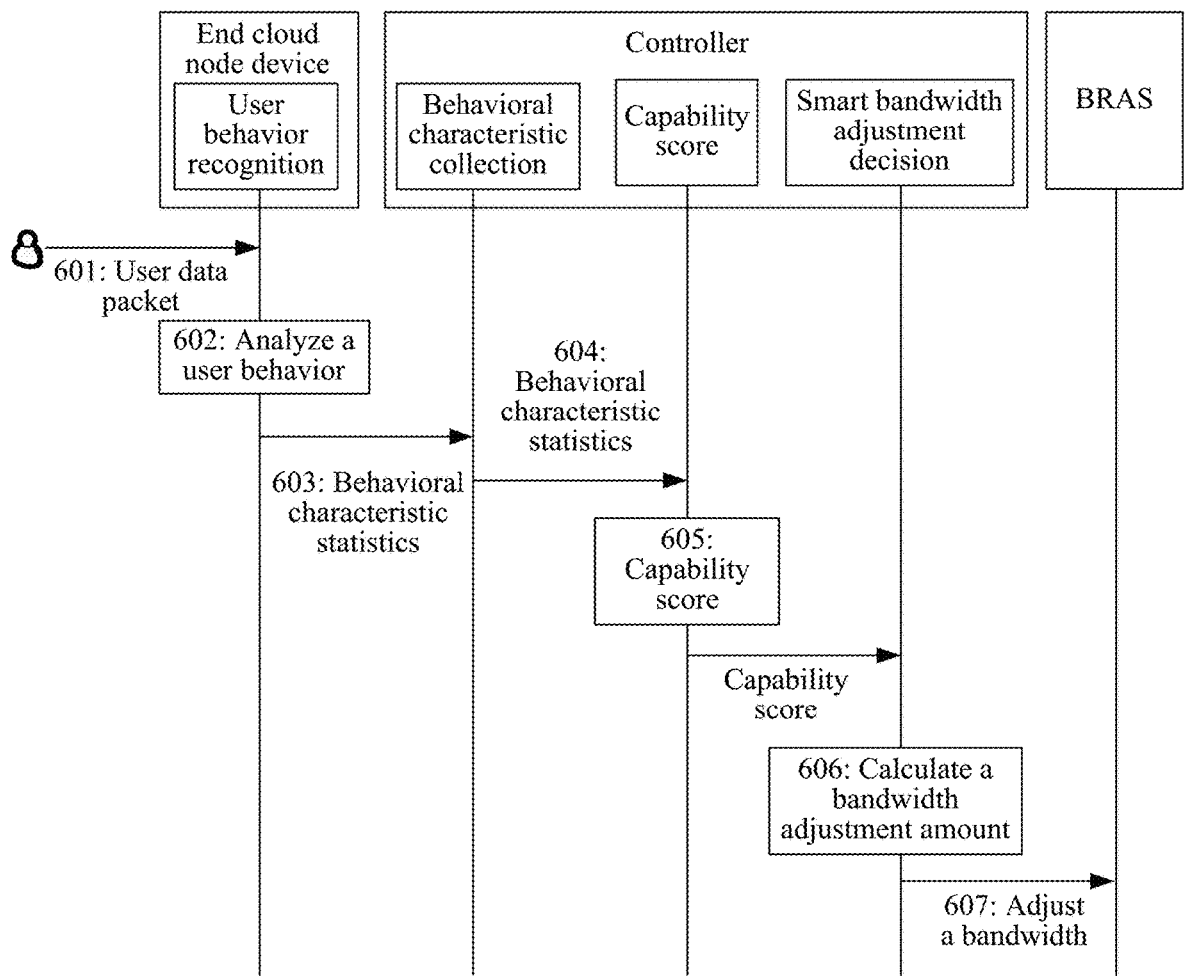
FIG. 6 is a schematic diagram of a bandwidth adjustment process performed by an end cloud node device, a controller, and a BRAS according to an embodiment of the present invention.

In a specific embodiment, as shown in FIG. 6, a complete bandwidth adjustment process performed by an end cloud node device, a controller, and a BRAS is as follows.

Step 601: The end cloud node device obtains a user data packet.

Step 602: The end cloud node device analyzes the user data packet and collects statistics about behavior characteristics of occupying network bandwidth by a user when accessing the end cloud node device, to obtain behavior characteristic statistics.

Step 603: The end cloud node device reports the obtained behavior characteristic statistics to the controller.

Step 604: The controller collects the behavior characteristic statistics reported by the end cloud node device.

Step 605: The controller obtains a capability score according to the collected behavior characteristic statistics.

Step 606: The controller calculates a bandwidth adjustment amount of the end cloud node device according to the obtained capability score and a system bandwidth resource usage status.

Step 607: The controller sends the obtained bandwidth adjustment amount to the BRAS, so that the BRAS adjusts, according to the obtained bandwidth adjustment amount, a bandwidth allocated to the end cloud node device by a network device on a transmission link between the end cloud node device and a gateway.

Figure 7:
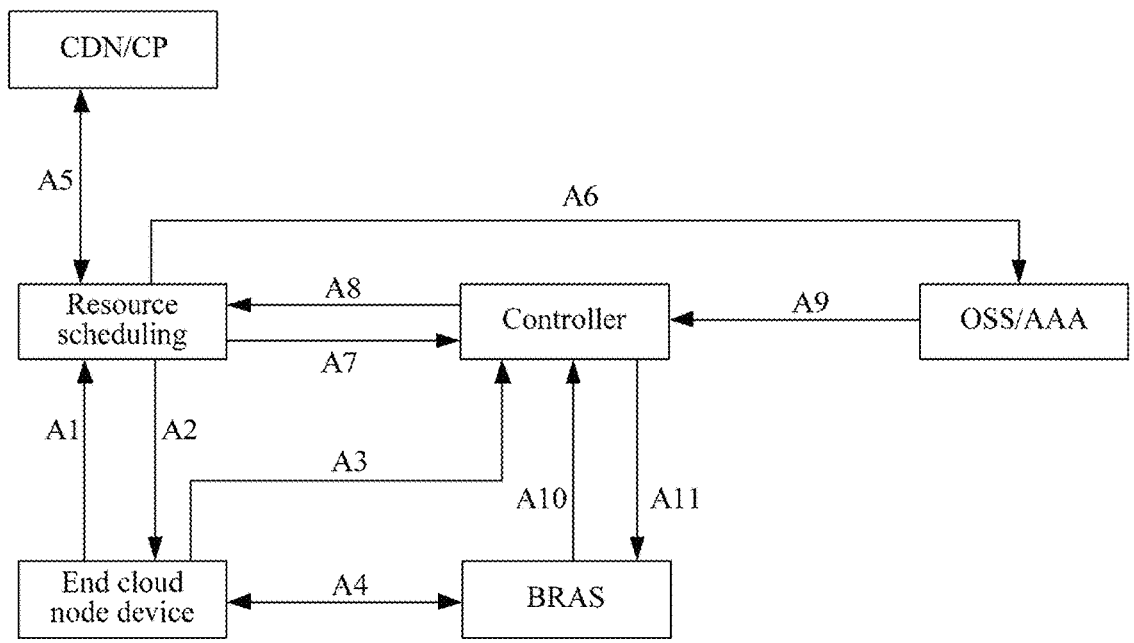
FIG. 7 is a schematic diagram of a system architecture when an end cloud node device provides a CDN service according to an embodiment of the present invention.

FIG. 7 is a schematic diagram of a system architecture when an end cloud node device provides a CDN service (that is, content service) according to a specific embodiment. A CDN/CP is a user to which a service is provided by the end cloud node device, and is configured to: initiate a resource service request to the end cloud node device, and push, to the end cloud node device by using an interface provided by the end cloud node device, content of a service that needs to be provided externally. A resource scheduling module is configured to register, manage, and maintain global resources of the end cloud node device that provides the service. An OSS/AAA is configured to: perform an operation such as authentication on the end cloud node device, record related information of the service provided by the end cloud node device, and provide a parameter to an accounting system. A1 to A11 are interfaces. The interface A1 is mainly configured to register a resource of the end cloud node device and report a resource status of the end cloud node device. The interface A2 is mainly used by the resource scheduling module to allocate, recycle, and access a resource of the end cloud node device. The interface A3 is mainly used by the end cloud node device to report behavior characteristic statistics. The interface A4 is mainly used by the end cloud node device to exchange information related to quality of service guarantee with a BRAS. The interface A5 is used by the resource scheduling module to provide an external service interface, provide a resource list, receive a system resource access request of a third party such as the CDN/CP, and obtain a comment of the third party on the used service provided by the end cloud node device. The interface A6 is used by the OS S/AAA to authenticate the registered resource of the end cloud node device, and obtain reported service-related information. The interface A7 is used by a controller to obtain, from the resource scheduling module, the comment of the third party on the service provided by the end cloud node device, so as to provide a capability score. The interface A8 is used by the controller to indicate, to the resource scheduling module, an order of node resource service capabilities according to values of capability scores. The resource scheduling module may specify a region or other information as an input condition for the controller to select a resource list. The interface A9 is used by the controller to obtain a transmission link characteristic of the end cloud node device from the OSS/AAA. The interface A10 is used by the controller to obtain a remaining bandwidth resource from the BRAS. The interface A11 is used by the controller to send a bandwidth adjustment instruction of the end cloud node device to the BRAS.

It should be noted that the system architecture provided by this specific embodiment is only an example. Interfaces between modules may correspondingly change according to different designs. For example, if the CDN/CP directly provides resource scheduling, the interface A5 is implemented inside the device. The interface in the system architecture is only a logical interface, and does not represent a physical connection relationship between devices. For example, the controller may directly exchange information with the BRAS by using an interface provided by the BRAS, or may indirectly exchange information with the BRAS by using an interface provided by a network management system, the OSS, an SDN controller, or the like.

In the foregoing embodiments, the example in which the end cloud node device provides the content service is used only for description. During actual application, the present invention may further be applied to many other application scenarios. For example, the present invention may further be applied to the following scenarios:

Scenario 1: Ubiquitous computing. That is, in a distributed computing system that connects computing devices in any forms into a network and that provides a service, in addition to providing a computing resource, the end cloud node device may further manage the computing resource and flexibly adjust a bandwidth according to network bandwidth requirements of different computing tasks.

Scenario 2: Smart uploading. For a service such as cloud storage that has a relatively high requirement on an uplink bandwidth, the end cloud node device improves user experience by means of local caching, by performing asynchronous uploading to avoid time periods with severe network congestion, by increasing the uplink bandwidth, by means of TCP acceleration in a wide area network, or the like.

Scenario 3: Private safe. For a leakage risk of a public cloud storage service, the end cloud node device can provide physically isolated storage space, use a triple mechanism including a password, a signature, and encryption to ensure secure remote access to stored content, and improve user experience of remote access by adjusting an uplink bandwidth.

Scenario 4: Wireless home. For a transmission performance degradation problem caused by WiFi channel contention, interference, deployment locations, and the like, the end cloud node device may implement TCP optimization on a wide area network and a WiFi home network segment by segment, and may further implement smart bandwidth adjustment to achieve a better effect. In addition, the end cloud node device may further implement a new WiFi-related function such as WiFi-based indoor positioning or WiFi charging.

Scenario 5: Smart household. For a problem that IoT devices supporting different IoT protocols cannot communicate with each other, the end cloud node device may implement a function of a physical layer gateway, to enable the IoT devices supporting the different IoT protocols to interwork with each other. In addition, some IoT application data may be locally stored and locally processed by using a computing/storage capability of the end cloud node device, and sent to a cloud after being processed, so as to reduce an amount of transmitted data and reduce a delay. In addition, the end cloud node device may further provide functions such as IoT application identification and QoS guarantee and a semantic network (IoT function virtualization and a unified interface).

In addition, the present invention may further be applied to a data center of an enterprise, a campus, or the like. In this scenario, the end cloud node device may be an access router (AR) or a top-of-rack (TOR) switch of the data center, devices corresponding to an OLT are switches at different levels and an egress router of the data center, and a device corresponding to a BRAS is a service router (SR).

Figure 8:
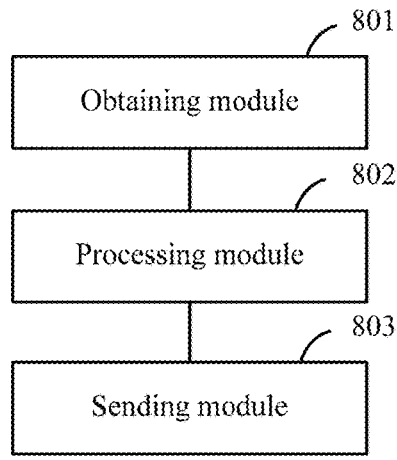
FIG. 8 is a schematic structural diagram of a controller according to an embodiment of the present invention.

Based on a same inventive concept, an embodiment of the present invention further provides a controller. For specific implementation of the controller, refer to the description about the controller in the foregoing method embodiment. Repeated parts are not described again. As shown in FIG. 8, the controller mainly includes:

an obtaining module 801, configured to: obtain behavior characteristic statistics sent by an end cloud node device, and obtain bandwidth resources remaining on a system, where the behavior characteristic statistics are a statistical result indicating behavior characteristics of occupying network bandwidth by a user when accessing the end cloud node device;

a processing module 802, configured to determine a bandwidth adjustment amount of the end cloud node device according to the behavior characteristic statistics and bandwidth remaining on the system; and a sending module 803, configured to send a bandwidth adjustment instruction to a first network device, where the bandwidth adjustment instruction is used to instruct the first network device to adjust, according to the bandwidth adjustment amount, a bandwidth allocated to the end cloud node device by a network device on a transmission link.

During implementation, the processing module 802 is configured to: determine a capability score according to the behavior characteristic statistics and a scoring parameter, where the capability score is used to reflect a service providing capability of the end cloud node device; and determine the bandwidth adjustment amount of the end cloud node device according to the capability score and bandwidth remaining on the system.

In a specific implementation, the processing module 802 includes a capability score submodule and a bandwidth adjustment decision submodule. The capability score submodule is configured to determine the capability score according to the behavior characteristic statistics and the scoring parameter, where the capability score is used to reflect the service providing capability of the end cloud node device. The bandwidth adjustment decision submodule is configured to determine the bandwidth adjustment amount of the end cloud node device according to the capability score and bandwidth remaining on the system. In this specific implementation, the capability score submodule and the bandwidth adjustment decision submodule are separated, so that even if the behavior characteristic statistics obtained by the obtaining module change in form or quantity, the bandwidth adjustment decision submodule is not affected.

The scoring parameter includes, but is not limited to, any one or a combination of a transmission link characteristic of the end cloud node device, a processing capability of the end cloud node device, a comment of an end cloud service user on a service provided by the end cloud node device, or historical capability score data of the end cloud node device.

During implementation, the first network device is a network device located on a transmission link connecting the end cloud node device and a gateway, or the first network device is a network device that has established a connection to at least one network device located on a transmission link connecting the end cloud node device and a gateway.

Figure 9:
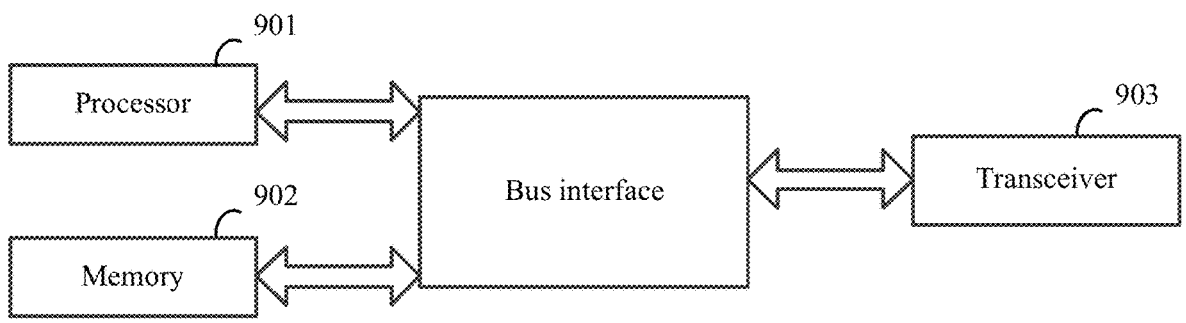
FIG. 9 is a schematic structural diagram of another controller according to an embodiment of the present invention.

Based on a same inventive concept, an embodiment of the present invention further provides a controller. For specific implementation of the controller, refer to the description about the controller in the foregoing method embodiment. Repeated parts are not described again. As shown in FIG. 9, the controller mainly includes a processor 901, a memory 902, and a transceiver 903. The memory 902 stores a preset program. The processor 901 reads the program stored in the memory 902 to perform the following process according to the program:

obtaining behavior characteristic statistics sent by an end cloud node device, and obtaining bandwidth resources remaining on a system, where the behavior characteristic statistics are a statistical result indicating behavior characteristics of occupying network bandwidth resources by a user when accessing the end cloud node device;

determining a bandwidth adjustment amount of the end cloud node device according to the behavior characteristic statistics and bandwidth remaining on the system; and instructing the transceiver 903 to send a bandwidth adjustment instruction to a first network device, where the bandwidth adjustment instruction is used to instruct the first network device to adjust, according to the bandwidth adjustment amount, a bandwidth allocated to the end cloud node device by a network device on a transmission link.

During implementation, the processor determines a capability score according to the behavior characteristic statistics and a scoring parameter, where the capability score is used to reflect a service providing capability of the end cloud node device; and determines the bandwidth adjustment amount of the end cloud node device according to the capability score and bandwidth remaining on the system.

The scoring parameter includes, but is not limited to, any one or a combination of a transmission link characteristic of the end cloud node device, a processing capability of the end cloud node device, a comment of an end cloud service user on a service provided by the end cloud node device, or historical capability score data of the end cloud node device.

During implementation, the first network device is a network device located on a transmission link connecting the end cloud node device and a gateway, or the first network device is a network device that has established a connection to at least one network device located on a transmission link connecting the end cloud node device and a gateway.

A bus architecture may include any quantity of interconnected buses and bridges, and specifically links together circuits such as one or more processors represented by the processor and one or more memories represented by the memory. The bus architecture may further link various other circuits such as a peripheral device, a voltage regulator, and a power management circuit. This is well known in the art, and therefore, no further description is provided in this specification. A bus interface provides an interface. The transceiver may be multiple components, that is, include a transmitter and a receiver, and provide units for communicating with various other apparatuses on a transmission medium. The processor is responsible for managing the bus architecture and general processing. The memory may store data used by the processor when the processor performs an operation.

Figure 10:
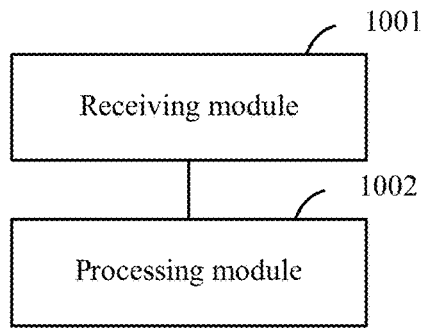
FIG. 10 is a schematic structural diagram of a network device according to an embodiment of the present invention.

Based on a same inventive concept, an embodiment of the present invention further provides a network device. For specific implementation of the network device, refer to the description about the first network device in the foregoing method embodiment. Repeated parts are not described again. As shown in FIG. 10, the network device mainly includes:

a receiving module 1001, configured to receive a bandwidth adjustment instruction sent by a controller, where the bandwidth adjustment instruction carries a bandwidth adjustment amount of an end cloud node device; and a processing module 1002, configured to adjust, according to the bandwidth adjustment amount, a bandwidth allocated to the end cloud node device by a network device located on a transmission link connecting the end cloud node device and a gateway.

During implementation, the network device is a network device on the transmission link of the end cloud node device, or the network device is a network device that has established a connection to at least one network device on the transmission link.

Figure 11:
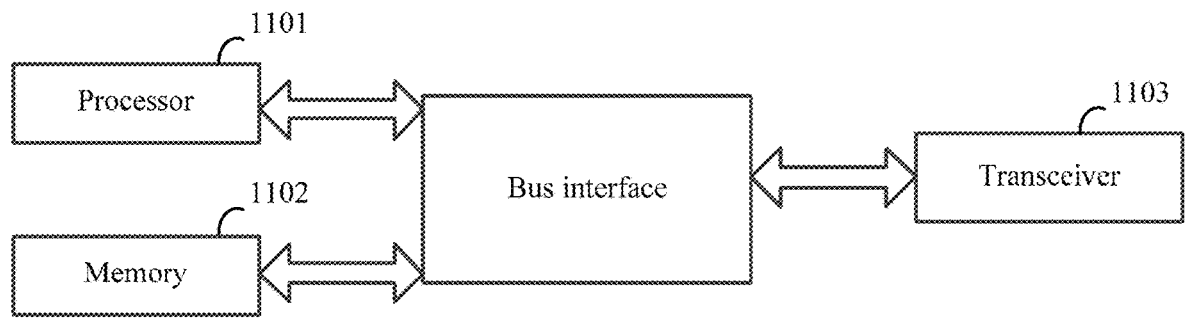
FIG. 11 is a schematic structural diagram of another network device according to an embodiment of the present invention.

Based on the same inventive concept, an embodiment of the present invention further provides a network device. For specific implementation of the network device, refer to the description about the first network device in the foregoing method embodiment. Repeated parts are not described again. As shown in FIG. 11, the network device mainly includes a processor 1101, a memory 1102, and a transceiver 1103. The memory 1102 stores a preset program. The processor reads the program stored in the memory to perform the following process according to the program:

receiving, by using the transceiver 1103, a bandwidth adjustment instruction sent by a controller, where the bandwidth adjustment instruction carries a bandwidth adjustment amount of an end cloud node device; and adjusting, according to the bandwidth adjustment amount, a bandwidth allocated to the end cloud node device by a network device located on a transmission link connecting the end cloud node device and a gateway.

A bus architecture may include any quantity of interconnected buses and bridges, and specifically links together circuits such as one or more processors represented by the processor and a memory represented by the memory. The bus architecture may further link various other circuits such as a peripheral device, a voltage regulator, and a power management circuit. This is well known in the art, and therefore, no further description is provided in this specification. A bus interface provides an interface. The transceiver may be multiple components, that is, include a transmitter and a receiver, and provide units for communicating with various other apparatuses on a transmission medium. The processor is responsible for managing the bus architecture and general processing. The memory may store data used by the processor when the processor performs an operation.

Figure 12:
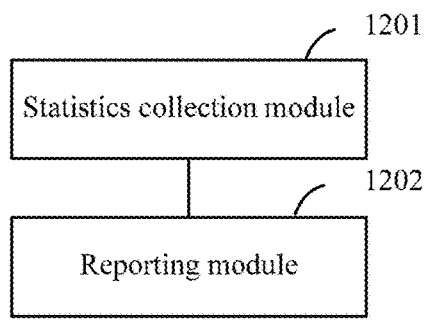
FIG. 12 is a schematic structural diagram of an end cloud node device according to an embodiment of the present invention.

Based on a same inventive concept, an embodiment of the present invention further provides an end cloud node device. For specific implementation of the end cloud node device, refer to the description about the end cloud node device in the foregoing method embodiment. Repeated parts are not described again. As shown in FIG. 12, the end cloud node device mainly includes:

a statistics collection module 1201, configured to collect statistics about behavior characteristics of occupying network bandwidth by a user when accessing the end cloud node device, to obtain behavior characteristic statistics; and a reporting module 1202, configured to report the behavior characteristic statistics to a controller, so that the controller determines a bandwidth adjustment amount of the end cloud node device according to the behavior characteristic statistics and bandwidth remaining on a system.

In some embodiments, the end cloud node device further includes a determining module, configured to: determine whether a to-be-transmitted service flow is a service flow for providing a service; and if determining that the to-be-transmitted service flow is a service flow for providing the service, transmit the service flow by using a first bandwidth, where the first bandwidth is a bandwidth after adjustment is performed according to an instruction of a first network device; or if determining that the to-be-transmitted service flow is not a service flow for providing the service, transmit the service flow by using a second bandwidth, where the second bandwidth is a bandwidth before adjustment is performed according to an instruction of the first network device.

The bandwidth adjustment amount is an uplink bandwidth adjustment amount.

Figure 13:
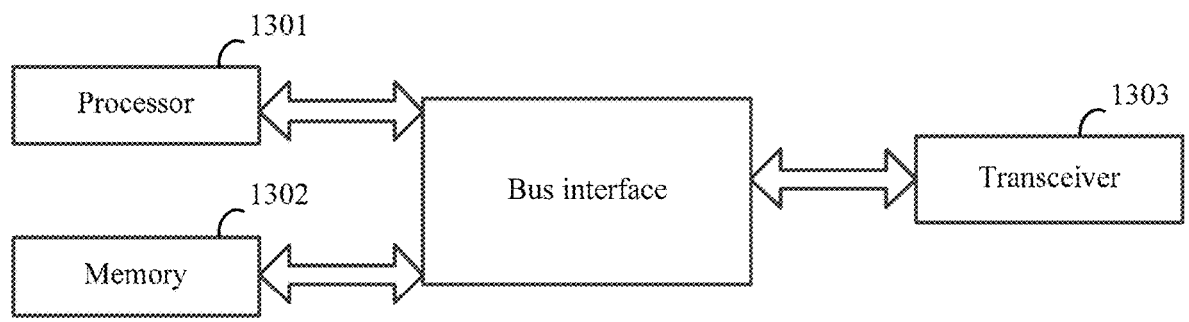
FIG. 13 is a schematic structural diagram of another end cloud node device according to an embodiment of the present invention.

Based on the same inventive concept, an embodiment of the present invention further provides an end cloud node device. For specific implementation of the end cloud node device, refer to the description about the end cloud node device in the foregoing method embodiment. Repeated parts are not described again. As shown in FIG. 13, the end cloud node device mainly includes a processor 1301, a memory 1302, and a transceiver 1303. The memory 1302 stores a preset program.

The processor reads the program stored in the memory to perform the following process according to the program:

collecting statistics about behavior characteristics of occupying network bandwidth by a user when accessing the end cloud node device, to obtain behavior characteristic statistics; and reporting, by using the transceiver 1303, the behavior characteristic statistics to a controller, so that the controller determines a bandwidth adjustment amount of the end cloud node device according to the behavior characteristic statistics and bandwidth remaining on a system.

In some embodiments, the processor 1301 determines whether a to-be-transmitted service flow is a service flow for providing a service; and if determining that the to-be-transmitted service flow is a service flow for providing the service, transmits the service flow by using a first bandwidth, where the first bandwidth is a bandwidth after adjustment is performed according to an instruction of a first network device; or if determining that the to-be-transmitted service flow is not a service flow for providing the service, transmits the service flow by using a second bandwidth, where the second bandwidth is a bandwidth before adjustment is performed according to an instruction of the first network device.

The bandwidth adjustment amount is an uplink bandwidth adjustment amount.

A bus architecture may include any quantity of interconnected buses and bridges, and specifically links together circuits such as one or more processors represented by the processor and a memory represented by the memory. The bus architecture may further link various other circuits such as a peripheral device, a voltage regulator, and a power management circuit. This is well known in the art, and therefore, no further description is provided in this specification. A bus interface provides an interface. The transceiver may be multiple components, that is, include a transmitter and a receiver, and provide units for communicating with various other apparatuses on a transmission medium. The processor is responsible for managing the bus architecture and general processing. The memory may store data used by the processor when the processor performs an operation.

Based on the foregoing technical solutions, in the embodiments of the present invention, the controller determines the bandwidth adjustment amount according to the behavior characteristic statistics of the end cloud node device and bandwidth remaining on the system, and sends the bandwidth adjustment instruction to the first network device, to instruct the first network device to adjust, according to the determined bandwidth adjustment amount, the bandwidth allocated to the end cloud node device by the network device on the transmission link. Therefore, a bandwidth allocated to a single end cloud node device can be dynamically adjusted, thereby improving utilization of system bandwidth resources.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

Obviously, a person skilled in the art can make various modifications and variations to the present invention without departing from the scope of the present invention. The present invention is intended to cover these modifications and variations provided that they fall within the protection scope defined by the following claims and their equivalent technologies.

What is claimed is:

1. A bandwidth adjustment method, comprising:

obtaining, by a controller, behavior characteristic statistics sent by an end cloud node device, and obtaining bandwidth resource remaining on a system, wherein the behavior characteristic statistics is a statistical result indicating behavior characteristics of occupying network bandwidth resources by a user when accessing a service through the end cloud node device;

determining, according to the behavior characteristic statistics and bandwidth resource remaining on the system, by the controller, a bandwidth adjustment amount allocated to the end cloud node device for service provisioning by the end cloud node device; and sending, by the controller, a bandwidth adjustment instruction to a first network device, wherein the bandwidth adjustment instruction is configured to instruct the first network device to adjust, according to the bandwidth adjustment amount, a bandwidth allocated to the end cloud node device by a network device on a transmission link;

wherein determining, by the controller, a bandwidth adjustment amount of the end cloud node device according to the behavior characteristic statistics and bandwidth remaining on the system comprises:

determining, by the controller, a capability score according to the behavior characteristic statistics and a scoring parameter, wherein the capability score is used to reflect a service providing capability of the end cloud node device for the service provisioning; and determining, by the controller, the bandwidth adjustment amount of the end cloud node device according to the capability score and bandwidth remaining on the system.

2. The method according to claim 1, wherein the scoring parameter comprises any one or a combination of a transmission link characteristic of the end cloud node device, a processing capability of the end cloud node device, a comment of an end cloud service user on the service provided by the end cloud node device, and historical capability score data of the end cloud node device.

3. The method according to claim 1, wherein the service provisioning by the end cloud node device is at least one of: a content delivery network (CDN) service, a computing service, or a cloud storage service.

4. The method according to claim 1, wherein the first network device is a network device located on a transmission link connecting the end cloud node device and a gateway.

5. The method according to claim 1, wherein the first network device is a network device that has established a connection to at least one network device located on a transmission link connecting the end cloud node device and a gateway.

6. A bandwidth adjustment method, comprising:

collecting, by an end cloud node device, statistics about behavior characteristics of occupying network bandwidth resources by a user when accessing a service through the end cloud node device, to obtain behavior characteristic statistics; and reporting, by the end cloud node device, the behavior characteristic statistics to a controller, so that the controller determines, according to the behavior characteristic statistics and bandwidth remaining on a system, a bandwidth adjustment amount allocated to the end cloud node device for service provisioning by the end cloud node device.

7. The method according to claim 6, wherein the method further comprises:
determining, by the end cloud node device, whether a to-be-transmitted service flow is a service flow for the service provisioning; and transmitting the service flow by using a first bandwidth when determining that the to-be-transmitted service flow is a service flow for providing the service, wherein the first bandwidth is a bandwidth after adjustment is performed according to an instruction of a first network device.

8. The method according to claim 7, wherein the method further comprises:
transmitting the service flow by using a second bandwidth when determining that the to-be-transmitted service flow is not a service flow for providing the service, wherein the second bandwidth is a bandwidth before adjustment is performed according to an instruction of the first network device.

9. The method according to claim 6, wherein the service provisioning by the end cloud node device is at least one of: a content delivery network (CDN) service, a computing service, or a cloud storage service.

10. The method according to claim 6, wherein the method further comprises:
determining, by the end cloud node device, whether a to-be-transmitted service flow is a service flow for providing the service; and transmitting the service flow by using a second bandwidth when determining that the to-be-transmitted service flow is not a service flow for providing the service, wherein the second bandwidth is a bandwidth before adjustment is performed according to an instruction of the first network device.

11. A controller, comprising:
a processor; and
a non-transitory computer readable medium which contains computer-executable instructions;
the processor is configured to execute the computer-executable instructions to perform operations comprising:
obtaining behavior characteristic statistics sent by an end cloud node device, and obtaining bandwidth resources remaining on a system, wherein the behavior characteristic statistics are a statistical result indicating behavior characteristics of occupying network bandwidth resources by a user when accessing a service through the end cloud node device;
determining, according to the behavior characteristic statistics and bandwidth resource remaining on the system, by the controller, a bandwidth adjustment amount allocated to the end cloud node device for service provisioning by the end cloud node device; and
sending a bandwidth adjustment instruction to a first network device, wherein the bandwidth adjustment instruction is used to instruct the first network device to adjust, according to the bandwidth adjustment amount, a bandwidth allocated to the end cloud node device by a network device on a transmission link;
wherein determining a bandwidth adjustment amount of the end cloud node device according to the behavior characteristic statistics and bandwidth resources remaining on the system comprises:
determining a capability score according to the behavior characteristic statistics and a scoring parameter, wherein the capability score is used to reflect a service providing capability of the end cloud node device for the service provisioning; and
determining the bandwidth adjustment amount of the end cloud node device according to the capability score and bandwidth remaining on the system.

12. The controller according to claim 11, wherein the scoring parameter comprises any one or a combination of a transmission link characteristic of the end cloud node device, a processing capability of the end cloud node device, a comment of an end cloud service user on the service provided by the end cloud node device, and historical capability score data of the end cloud node device.

13. The controller according to claim 11, wherein the service provisioning by the end cloud node device is at least one of: a content delivery network (CDN) service, a computing service, or a cloud storage service.

14. An end cloud node device, comprising:
a processor; and
a non-transitory computer readable medium which contains computer-executable instructions;
the processor is configured to execute the computer-executable instructions to perform operations comprising:
collecting statistics about behavior characteristics of occupying network bandwidth resources by a user when accessing a service through the end cloud node device, to obtain behavior characteristic statistics; and
reporting the behavior characteristic statistics to a controller, so that the controller determines, according to the behavior characteristic statistics and bandwidth remaining on a system, a bandwidth adjustment amount allocated to the end cloud node device for service provisioning by the end cloud node device.

15. The end cloud node device according to claim 14, wherein the processor is further configured to execute the computer-executable instructions to perform an operation comprising:
determining whether a to-be-transmitted service flow is a service flow for the service provisioning; and transmitting the service flow by using a first bandwidth when determining that the to-be-transmitted service flow is a service flow for providing the service, wherein the first bandwidth is a bandwidth after adjustment is performed according to an instruction of a first network device.

16. The end cloud node device according to claim 15, wherein the processor is further configured to execute the computer-executable instructions to perform an operation comprising:
transmitting the service flow by using a second bandwidth when determining that the to-be-transmitted service flow is not a service flow for providing the service, wherein the second bandwidth is a bandwidth before adjustment is performed according to an instruction of the first network device.

17. The end cloud node device according to claim 15, wherein the service provisioned by the end cloud node device is at least one of: a content delivery network (CDN) service, a computing service, or a cloud storage service.

18. The end cloud node device according to claim 14, wherein the processor is further configured to execute the computer-executable instructions to perform an operation comprising:
determining whether a to-be-transmitted service flow is a service flow for the service provisioning; and transmitting the service flow by using a second bandwidth when determining that the to-be-transmitted service flow is not a service flow for providing the service, wherein the second bandwidth is a bandwidth before adjustment is performed according to an instruction of the first network device.

19. The method according to claim 1, wherein the bandwidth adjustment amount is uplink bandwidth adjustment amount allocated to the end cloud node device.

20. The method according to claim 1, wherein the behavioral characteristic statistics comprises uplink and downlink transmission bitrates.

21. The method according to claim 11, wherein the bandwidth adjustment amount is uplink bandwidth adjustment amount allocated to the end cloud node device.

22. The method according to claim 11, wherein the behavioral characteristic statistics comprises uplink and downlink transmission bitrates.

23. The method of claim 1, wherein adjusting, according to the bandwidth adjustment amount, a bandwidth allocated to the end cloud node device by a network device on a transmission link comprises: reducing the bandwidth allocated to the end cloud node device by the network device on the transmission link.

\* \* \* \* \*